US007992140B2

(12) United States Patent  (10) Patent No.:  US 7,992,140 B2
Meijer et al.  (45) Date of Patent:  Aug. 2, 2011

(54) COMPILER SUPPORTING PROGRAMS AS DATA OBJECTS

(75) Inventors: Henricus Johannes Maria Meijer, Mercer Island, WA (US); Anders Hejlsberg, Seattle, WA (US); Matthew J. Warren, Redmond, WA (US); Dinesh Chandrakant Kulkarni, Sammamish, WA (US); Luca Bolognese, Redmond, WA (US); Peter A. Hallam, Seattle, WA (US); Gary S. Katzenberger, Woodinville, WA (US); Donald Box, Yarrowpoint, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 11/193,721

(22) Filed: Jul. 29, 2005

(65) Prior Publication Data

US 2007/0028223 A1  Feb. 1, 2007

(51) Int. Cl.
*G06F 9/45* (2006.01)
*G06F 9/44* (2006.01)
*G06F 7/00* (2006.01)
*G06F 17/30* (2006.01)

(52) U.S. Cl. ......................... 717/140; 717/137; 717/114
(58) Field of Classification Search .......... 717/114–119, 717/136–140, 145–148
See application file for complete search history.

(56) References Cited

U.S. PATENT DOCUMENTS

| 6,378,126 | B2 * | 4/2002 | Tang ............................. 717/143 |
| 6,574,673 | B1 * | 6/2003 | Hari et al. .................... 719/310 |
| 7,409,636 | B2 | 8/2008 | Meijer |
| 7,631,011 | B2 | 12/2009 | Kulkarni |
| 7,685,567 | B2 | 3/2010 | Meijer |
| 7,694,274 | B2 | 4/2010 | Meijer |
| 7,702,686 | B2 | 4/2010 | Meijer |
| 7,743,066 | B2 | 6/2010 | Meijer |
| 7,818,719 | B2 | 10/2010 | Meijer |
| 2002/0091702 | A1 | 7/2002 | Mullins |
| 2007/0027849 | A1 | 2/2007 | Meijer |
| 2007/0027905 | A1 | 2/2007 | Warren |
| 2007/0028222 | A1 | 2/2007 | Meijer |
| 2007/0044083 | A1 | 2/2007 | Meijer |
| 2010/0175048 | A1 | 7/2010 | Meijer |
| 2010/0217776 | A1 | 8/2010 | Meijer |

OTHER PUBLICATIONS

Ahmed, Syed Mujeeb, Jack Melnich, Neelam Singh, and Tim Smith. Pro*C/C++ Precompiler Programmers Guide, Release 9.2. Copyright © 1996, 2002 Oracle Corporation. Part No. A97269-01. Accessed online Dec. 15, 2008.*

(Continued)

*Primary Examiner* — Michael J Yigdall
*Assistant Examiner* — Erika Kretzmer
(74) *Attorney, Agent, or Firm* — Wolf, Greenfield & Sacks, P.C.

(57) ABSTRACT

A compiler supporting a language in which selected semantic objects are represented as data objects. The data objects may be used in multiple ways to expand the capabilities of the programming language. Data objects may be passed to applications and used to create executable instructions for that application. In this way, instructions written in the native language of the compiler may be used to control applications that accept programs in a language inconsistent with the native language of the compiler. The syntax checking and variable binding capabilities of the compiler may be used for those instructions that will be executed by an application separate from the object code generated by the compiler. The semantic objects represented as data objects may be selected based on express operations included in the source code or may be based on implicit type conversion.

16 Claims, 6 Drawing Sheets

OTHER PUBLICATIONS

Burton, Kevin. .NET Common Language Runtime Unleashed. Apr. 4, 2002. Sams. "Chapter 14: Delegates and Events." Accessed online through Safari Books on Dec. 5, 2008 and Dec. 17, 2008.*

Microsoft. C# Language Specification. Accessed from the URL http://msdn.microsoft.com/en-us/library/aa691355(VS.71).aspx on Dec. 15, 2008. Chapter 7.5.5 Invocation expressions.*

Webster, J. (editor). Wiley Encyclopedia of Electrical and Electronics Engineering. 1999. John Wiley & Sons, Inc. "Functional Programming.".*

International Search Report and Written Opinion from PCT Application PCT/US2006/24419 dated Mar. 21, 2007.

* cited by examiner

FIG. 1

```
*
*
*
delegate R Function<T, R>(T t);
Function<int, bool> f = |x| x > 10;
Expression<Function<int, bool>> e = |x| x > 10;
*
*
*
```

FIG. 2A

```
*
*
*
int y = 10;
int z = 1;
Expression<Function<int, bool>> e = |x| x > y * z;
*
*
*
```

```
* * *
public static class Sequence          ⟵ 520
{
    public static IEnumerable<T> Where<T>(this IEnumerable<T> source, Func<T, bool> predicate){   ⟵ 522, 524
        foreach (T element in source) {
            if (predicate(element)) yield return element;    ⟵ 526
        }
    }
* * *
```

FIG. 5A

```
public class DClarityExtensions {
    ...
    public static Query<T> Where<T>(this Query<T> seq, Expression<Func<T, bool>> pred) {
        return new QueryImpl<T>(seq.Executor, DbFactory.Where(seq.Expression, pred));
    }
    ...
}
```

FIG. 5B

```
...
Customers.Where(c => c.Age > 42)
...
```

FIG. 5C

COMPILER SUPPORTING PROGRAMS AS DATA OBJECTS

BACKGROUND OF INVENTION

In some instances, it is desirable to treat computer program instructions as data objects. This need arises, for example, when a computer programmer is writing a computer program that accesses data from another application. For example, a programmer writing a program in the C programming language may wish to access a database that responds to queries written in the SQL programming language. To query the database from the C program, the C programmer may insert SQL commands as strings in the C program. A C compiler does not convert the strings into executable code. Rather, the C compiler stores the strings literally as they were entered by the programmer.

As the C program executes, the strings will be passed to an application programming interface (API) for the database. The API may compile or interpret the string and provide the appropriate commands to the database to perform the desired access to the database.

Compilers for languages such as Lisp/Scheme, MetaML, and Template-Haskel will also create data objects representing code in a source code file, if the code is explicitly quoted in the source code file.

SUMMARY OF INVENTION

The invention relates to a compiler that represents internal semantic objects within a source code file as data objects. In many instances, the semantic objects will be expressions constituting program instructions in source code form. In one aspect, the invention relates to processing the internal semantic objects according to a syntax used by the compiler to create the data object as an external semantic data structure. The data objects may be used in one of multiple ways. The data object may represent an expression or function that is to be performed by an application and may be supplied to that application to cause that application to execute the function or expression. In another aspect, the invention relates to automatic selection of internal semantic objects for representation as data objects. A compiler may selectively create an external semantic data structure from an internal semantic object to be passed as a parameter to a method constructed to receive a data object representing source code may be based on the type of argument the method receives, thus performing an implicit type conversion.

The foregoing summary is not limiting of the invention, which is defined by the appended claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

We have recognized that a computer language can be made more flexible by providing a compiler that selectively creates data objects from semantic objects in source code it compiles. The data objects may be created using a compile-time implicit type conversion from a semantic object internal to the source code being compiled to a data object containing a syntactic data representation of the semantic object. Data objects may be created for internal semantic objects in any desired form, such as a label, an expression, a delegate, a method, a class, a statement block or any other unit or grouping of source code instructions. In the description that follows, computer program instructions, particularly expressions, are used as an example of an internal semantic object.

The implicit type conversion may be regarded as a generalization of the type of (T) construct that allows programmers to obtain a (run-time) System.Type instance from a given compile-time type T. However, a data object may be created from an internal semantic object in any suitable way.

Such a compiler can simplify development of applications that access other applications. Where the semantic objects are computer program instructions intended to be executed by an application that responds to instructions in a programming language other than the native language of the compiler, code accessing that application may be written in the same source code language as the rest of the program. Further, implicit type conversion avoids the need for a programmer to explicitly quoting code expressions.

With such a compiler, a computer programmer can write instructions controlling access to an application in the native language of the compiler. Because the instructions are written in its native language, the compiler may process those instructions rather than simply storing them as a string, which can provide benefits such as allowing the compiler to detect syntax errors at compile time. Furthermore, the compiler can perform name binding and variable capture that might otherwise have been performed manually by the programmer. As a result, data objects representing computer program instructions available external to the compiler may reflect the semantics of their host language and may, for example, include variable names that have been resolved, types that have been checked or conversions that have been inserted according to the semantics of the host language. Significantly, this processing can occur at compile-time and therefore reduce errors that could occur at runtime when code that is simply processed as a string is executed.

Figure 1:
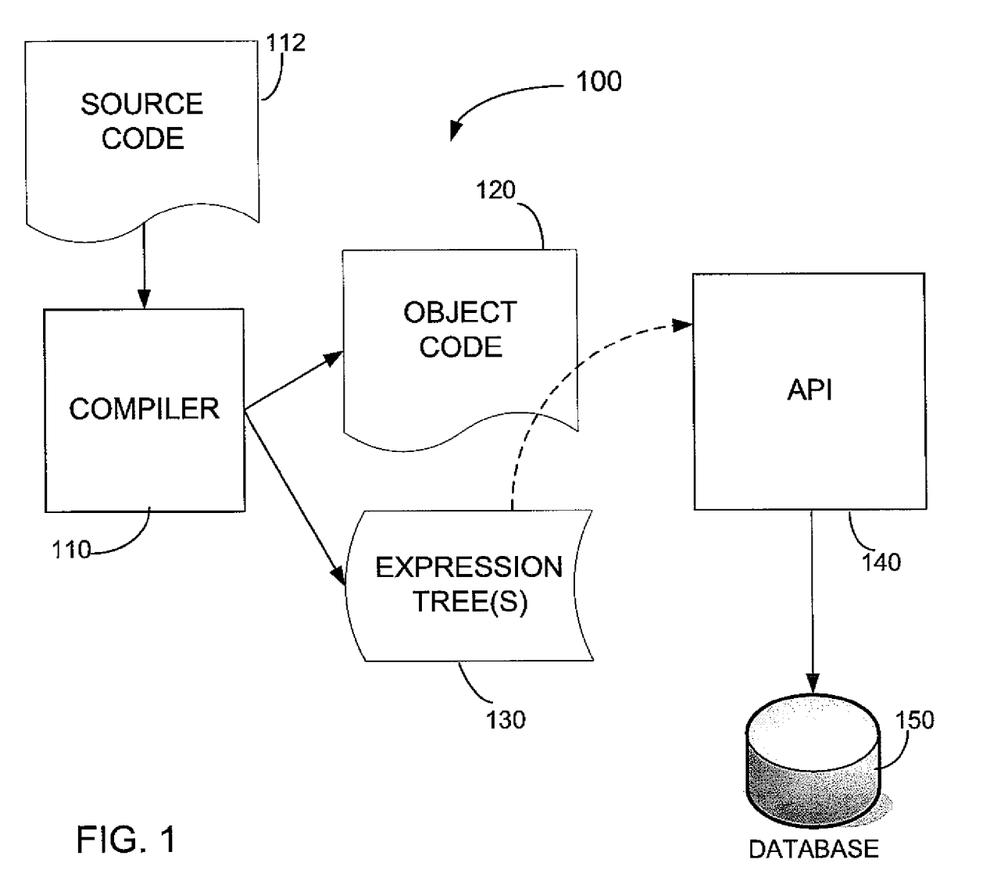
FIG. 1 is a sketch representing an application environment in which a compiler may be used.

As an example of a system in which such a compiler may be used, FIG. 1 shows an application environment 100 in simplified block diagram form. Application environment 100 may be created on a desktop computer running the WINDOWS® operating system. However, the specific application environment is not a limitation on the invention. Any suitable operating system may be used.

Further, any suitable hardware may be used to create application environment 100. One or more computers of any suitable type may be used to host application environment 100 and the computers may be configured in a stand-alone or networked configuration.

Under the WINDOWSindows® operating system, multiple applications may execute in an application environment.

In the illustrated embodiment, application environment 100 executes applications that include compiler 110 and database application 150. As is conventional, each of the applications may consist of a group of computer-executable instructions stored on a computer-readable medium. The application environment 100 may execute these instructions to perform functions of the application.

Compiler 110 operates on source code 112. Source code 112 may contain multiple semantic objects that define a program being developed by one or more programmers using the application environment 100. Source code 112 may be created in any convenient way and may be stored on computer-readable media associated with application environment 100. For example, a human programmer may create source code 112 by typing text at a keyboard (not shown) and storing it in a file associated with application environment 100.

The semantic objects within source code 112 may define a desired application under development by a human user. In the illustrated embodiment, source code 112 defines an application that manages storing, retrieving and otherwise accessing data maintained by database application 150. However, the specific application implemented by the source code 112 is not a limitation of the invention and source code 112 may represent a program prepared for any desired application.

Compiler 110 operates on the semantic objects contained within source code 112. As in a traditional compiler, compiler 110 may convert the semantic objects in source code 112 into computer-executable instructions stored as object code 120. Like source code 112, object code 120 may be stored in computer-readable media associated with application environment 100. However, object code 120 may be stored in any suitable manner in any suitable location.

Object code 120 forms a computer application that, in this example, is executed within the application environment 100. However, the location at which object code 120 is executed is not a limitation of the invention. Object code 120 may be executed on the same computer on which compiler 110 executes. Alternatively, object code 120 may be executed on a computer networked to the computer on which compiler 110 executes. As a further example of a possible variation, object code 120 may be recorded on movable media and distributed to multiple computers that are not connected to the computer in which compiler 110 operates.

In addition to creating object code 120, compiler 110 also creates one or more data objects that represent semantic objects contained within source code file 112. In the illustrated embodiment, the semantic objects that are represented as data objects are expressions written in the source code language on which compiler 110 operates, herein referred to as the "native language" of the compiler. Examples of expressions that may appear in source code file 112 include binary expressions, unary expressions, ternary expressions, constant expressions, field access expressions, property access expressions, method call expressions, object initializer expressions, object creation expressions, collection and array initializer expressions, array creation expressions, cast expressions, parameter reference expressions, lambda expressions, invocation of semantic trees expressions, free variable capture expressions or outer variable capture expressions.

Though the data objects may be used external to compiler 110, compiler 110 may apply the syntax rules of its native language in creating those data objects from the internal semantic objects. For example, the compiler may perform one or more operations that include: type checking, name binding, variable capture, overload resolution, error checking or other processing steps traditionally performed by a compiler in creating a representation of a semantic object used internally as a program being compiled. The data object may be stored in a data structure with fields containing data representing the results of one or more of these compiler operations applied to the internal semantic object. Such a structure may be termed a semantic data structure.

In application environment 100, some of the data objects created by compiler 110 to represent internal semantic objects are used external to compiler 110. In the example of FIG. 1, the data objects are provided to API 140 for use in controlling database 150 to perform an operation specified by the internal semantic objects.

Thus, in contrast to the prior art in which source code instructions intended to control a separate application were "quoted" and passed to the application as a string or other literal form, an external semantic data structure representing the source code instructions is provided. In the illustrated embodiment, the internal semantic objects are expressions and the external semantic data structures are expression trees 130. Expression trees 130 may be stored as data structures in computer-readable media associated with application environment 100. In the illustrated embodiment, the expression trees 130 are stored on computer-readable media accessible to the computer on which object code 120 executes.

Each expression tree may be stored in a generic form. Storing the expression trees in generic form allows the expression trees to be used in multiple contexts because they may be readily customized for any specific context in which they are used.

Compilers often form internal generic representations of expressions or other semantic objects as part of the process of forming object code. In the illustrated embodiment, expression trees 130 may be in the form used internally by compilers as known in the art to represent expressions as they are being processed. In the described embodiment, however, unlike in an existing compiler, data structures that represent selected semantic objects are stored in a manner that they may be accessed for processing within the compiler or accessed for processing outside of the compiler.

In the illustrated embodiment, expression trees 130 may be used to control database application 150 to perform operations specified by instructions in source code 112. The expression trees, representing instructions from source code 112, are provided to API 140. In this example, API 140 is an application program interface to database application 150.

API 140 converts the generic representation of the expressions contained within the expression trees 130 into instructions in a format that may be executed, such as by database application 150. As described above, known compilers contain a portion that creates representations of expressions as an intermediate step in forming executable code. Known compilers contain a second portion that translates the generic representation of expressions into executable code in the form that can be executed by database application 150. API 140, therefore, mimics the function of the portion of a known compiler that compiles code into a format that may be executed by database application 150. As a specific example, where database application 150 responds to SQL queries, API 140 may be implemented using technology, whether now known or hereafter developed, that is used in an SQL compiler to convert a generic representation of expressions into code executable by the database application.

In one embodiment, only a selected sub-set of the semantic objects within source code 112 are represented as external data structures. Compiler 110 may be constructed to recognize constructs in source code 112 that indicate certain semantic objects should be represented as external data objects. Those semantic objects could be represented as external data structures instead of or in addition to using those semantic objects to generate object code 120.

Figure 2A:
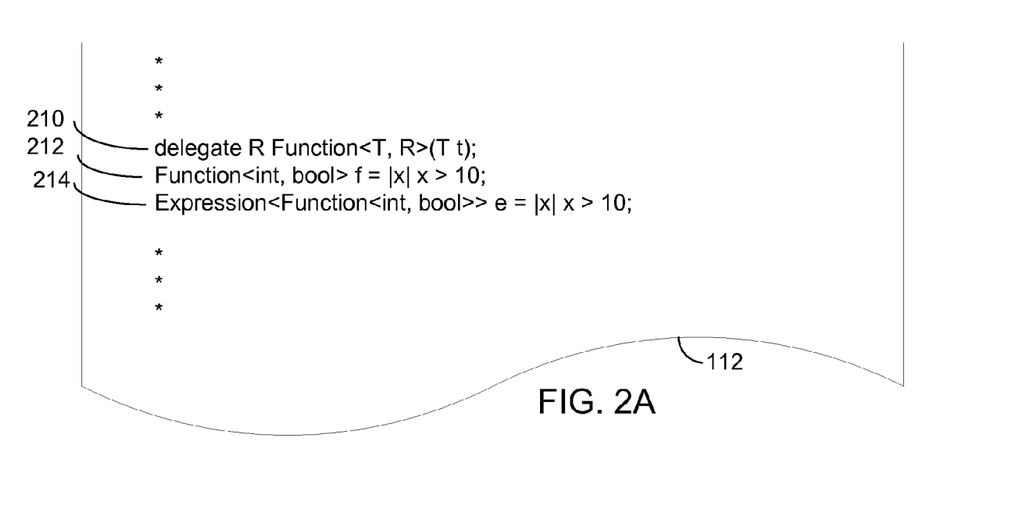
FIGS. 2A and 2B are sketches representing fragments of code that may be processed by the compiler of FIG. 1.
Figure 2B:
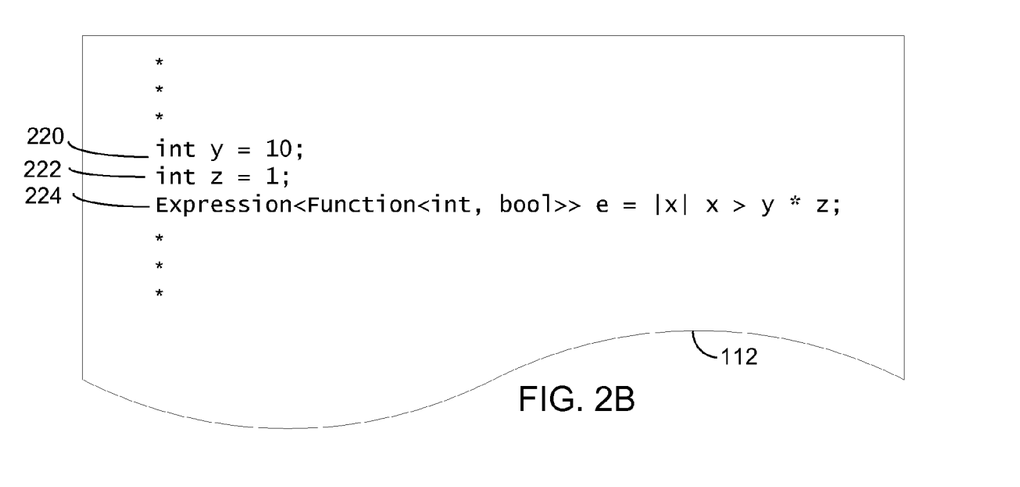

In the embodiment pictured in FIG. 1, the semantic objects selected to be represented as external data structures are those semantic objects that are instructions for an application to execute. Compiler 110 supports constructs to identify semantic objects to be represented in external semantic data structures. FIGS. 2A through 2B illustrate the syntax of instructions in source code file 112 that may control compiler 110 to generate the desired data structures. FIG. 2A depicts a portion of source code 112 that contains a sequence of instructions in source code form. The instructions 210, 212 and 214 illustrate different ways in which instructions may be treated by compiler 110.

Instruction 210 is a declaration of a delegate, R. The delegate R may be used to refer to a function. The delegate R may, for example, be implemented as a pointer to a function. In the describe embodiment, compiler 110 may allocate storage space for the delegate R, but does not generate object code for the delegate R.

Instruction 212 is the declaration of a function f. In this example, the function f receives an argument x that is of integer type and returns a value of Boolean type. The value returned depends on whether the value of the argument x is greater than 10. Compiler 110 creates object code that performs the operations necessary to process the argument and compute the value returned. This code is executed whenever the function f is called elsewhere in the computer program.

In contrast, instruction 214 represents the declaration of an expression. Instruction 214 begins with the keyword "Expression," which signifies to compiler 110 to create an external data structure representing the argument of the expression. In this example, the argument of the expression specifies a function e that performs the same operation as the function f. However, compiler 110 creates an external data structure when it processes instruction 214 rather than object code as is created when the compiler processes instruction 212.

FIG. 2B illustrates an alternative situation in which an instruction indicates that a data object should be created. FIG. 2B illustrates instructions 220 and 222 at which variables y and z are defined. Compiler 110 may process instructions 220 and 222 by allocating memory locations for each of the variables y and z and adding computer-executable instructions to object code 120 to initialize those memory locations to the stated values.

Instruction 224 begins with the keyword "Expression," signifying that instruction 224 defines an expression from which a data object should be created. In this example, the expression to be represented by the data object produces a Boolean value indicating whether an argument to the expression x is greater than the product of the values of variables y and z.

A complexity arises in preparing an external data structure representing the expression contained within instruction 224. The expression operates on variables that are defined outside the expression and are not provided as run-time arguments such variables may be called "free variables" or "outer variables." The values of those variables may change during execution of a program. Accordingly, in the described embodiment, the data object representing the expression in instruction 224 is not loaded with the values of the variables at the time the data object is create. Rather, the data object is created to include a reference to information allowing the current values of the variables y and z to be obtained. A similar issues arises when an expression refers to another expression. Appropriate reference to the second expression must be included in the data structure representing the first expression. One way to implement a reference from one expression to another is to incorporate into an external semantic data structure a mechanism to reference another external semantic data structure.

Any suitable representation of the information necessary to access the values of variables y and z may be incorporated into the data object. For example, a process called "funcletting" may be used. Funcletting involves capturing free variables or sub-expressions inside code as data objects. The underlying representation of the information to represent the free variable or sub-expression may be in any suitable form. As a specific example, the data object may contain an address of the memory locations where those values are stored. The memory address may be an absolute memory address or may be an offset into a stack frame or other data structure. As another example of how the value of a free variable or outer variable may be indicated, a pointer to a function that returns the value of the variable may be used.

The use of funcletting is not limited to providing a way to access an integer variable as shown in FIG. 2B. Reference may be made to variables of other types.

By providing information that indicates where values of the variables used within the expression may be obtained at the time the expression is executed, the data structure representing the expression may be readily converted to executable instructions that, when executed, perform the desired operation. The desired operations may be performed regardless of whether the conversion to executable instructions is performed at compile time or at runtime or at some intermediate time. Further, the desired operations may be performed regardless of when the object code generated from the data object is executed.

Figure 3A:
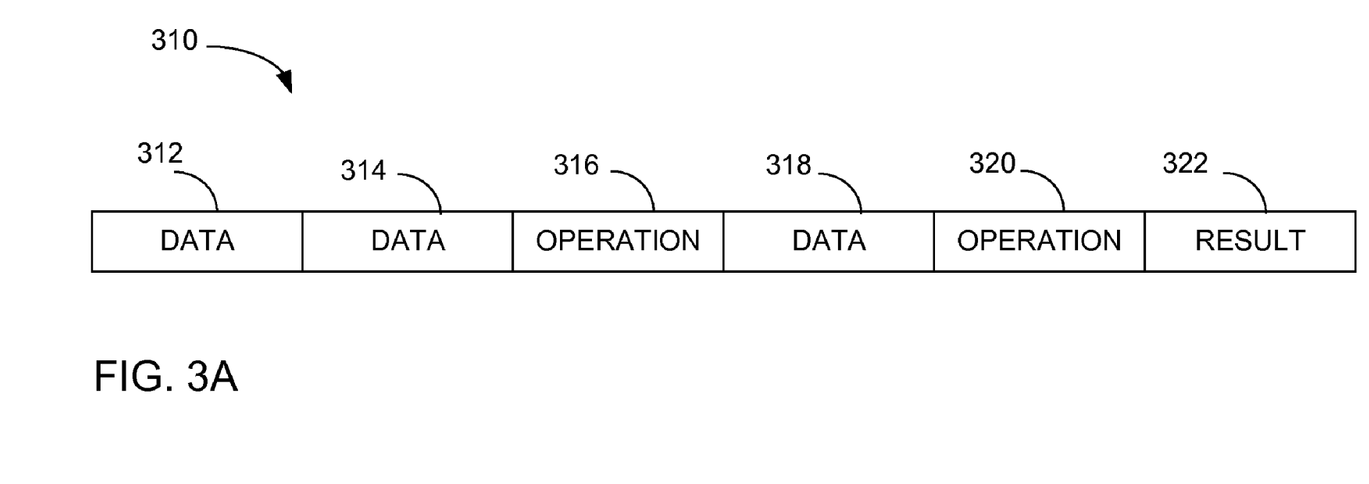
FIGS. 3A and 3B are sketches of data objects that may be used to represent expressions in the program segments of FIG. 2A and FIG. 2B.

Turning to FIG. 3A, a representation of a data object 310 for storing a semantic object in source code 112 is shown. Data object 310 may be implemented in any suitable computer-readable media and may have any form suitable to represent the semantic object. In this example, the semantic object is an expression defined in source code 112 and the data object is organized as an expression tree. The expression tree includes multiple fields, each of which contain information useful in evaluating the expression. Expression trees are known in the art and compiler 110 may create an expression tree from an expression in source code 112 in any suitable way.

In this example, the expression tree is represented with multiple fields, including data fields 312 and 314 and operation field 316. Data fields 312 and 314 may store data and operation field 316 may store an indication of an operation to be performed on the data in fields 312 and 314.

Data object 310 includes a further data field 318 and a further operation field 320. Operation field 320 may store an indication of an operation to be performed on the data in field 318 and the results of the operation indicated by operation field 316. In addition, data object 310 includes a result field at 322. Result field 322 may specify a location at which the result of evaluating the expression represented by data object 310 is to be stored.

Data object 310 representing an expression tree as pictured in FIG. 3A is one example of a data object. Any suitable form of data object may be used. For example, additional fields may be included but are not shown for simplicity. For example, any number of data fields and operation fields may be used. In addition, the data objects may include fields to indicate the number of data fields or the number of operation fields or fields to otherwise aid in representing an expression.

Figure 3B:
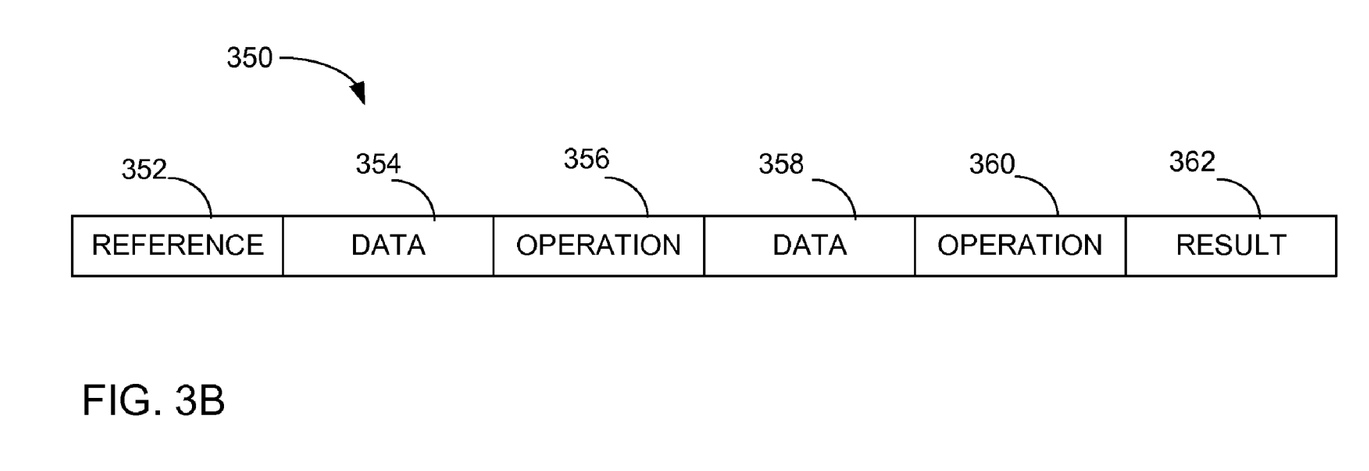

Turning to FIG. 3B, a second data object 350 is illustrated. Data object 350, like data object 310, includes fields such as 354 and 358 that specify data and fields such as 356 and 360 that specify operations to be performed on that data. Likewise data object 350 includes a result field 360 that specifies where a result may be stored. Data object 350 differs from data object 310 in that it includes a reference field 352. In this example, reference field 352 includes an indication of where the data used to perform the operation indicated by operation field 356 may be obtained. Reference field 352 may contain a direct or indirect memory address or other indicator that allows the data to be obtained. For example, reference field 352 may contain the address of a function that will retrieve the appropriate data.

FIGS. 3A and 3B provide an example of an implementation of an external data structure. Any suitable representation of a semantic expression tree may be used to represent an expression. More generally, other data structures may be employed to represent expressions or other internal semantic objects.

Figure 4:
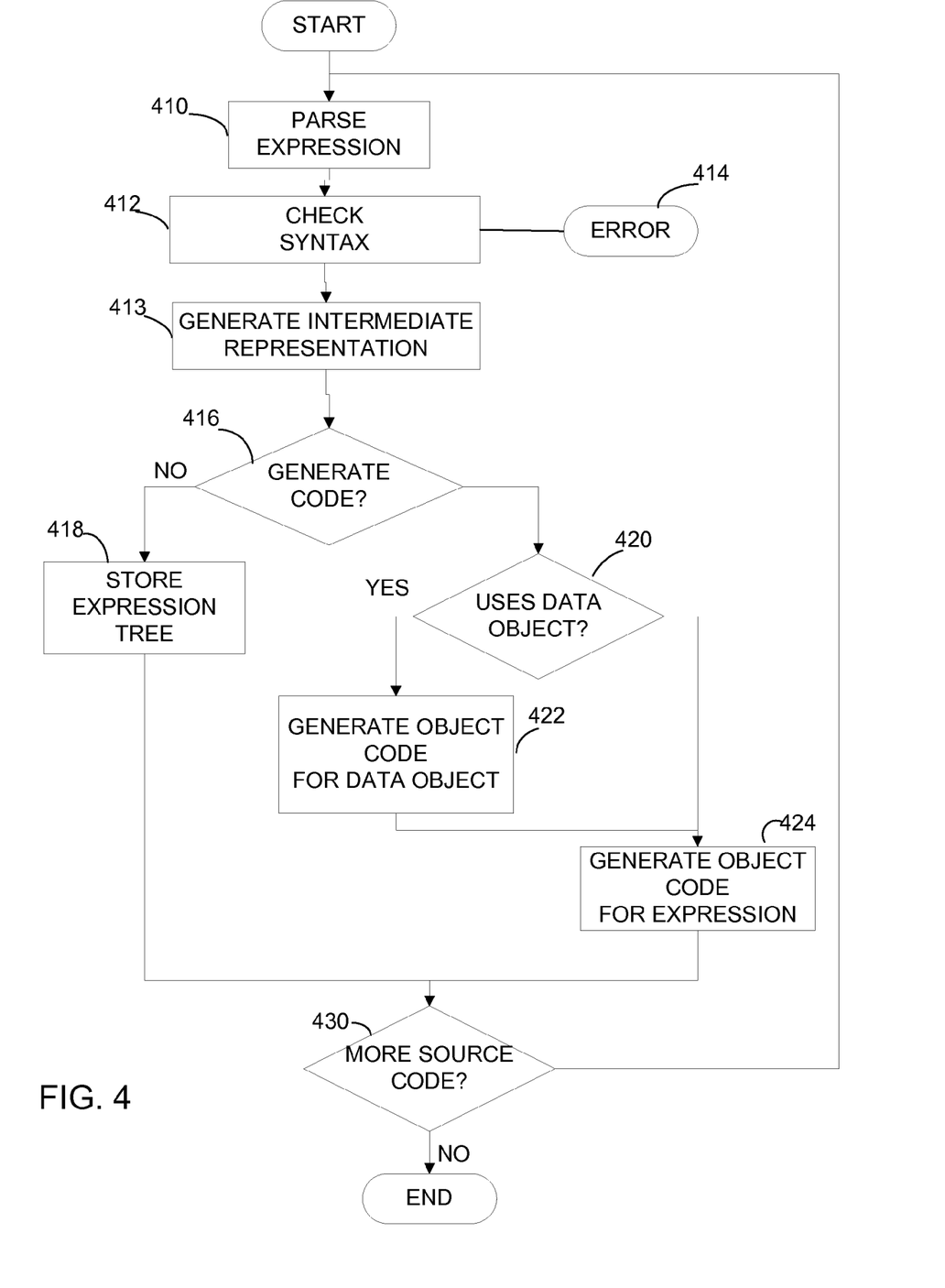
FIG. 4 is a flowchart of a process by which the compiler of FIG. 1 may operate.

FIG. 4 shows a process by which compiler 110 may operate to convert source code 112 into object code 120 and external semantic data structures, such as expression trees 130 (FIG. 1). The process begins at process block 410. At block 410, the compiler parses the source code 112 to identify an expression. Parsing source code is a known operation in compilers. The processing at block 410 may be performed as in a conventional compiler, whether now known or hereafter developed.

Once an expression is parsed from source code 112, processing of that expression continues at block 412. At block 412 the compiler checks the syntax of the expression. Syntax checking is also a known function of compilers and the processing in block 412 may be performed as in a conventional compiler, whether now known or hereafter developed. Syntax checking involves comparing the expression identified at block 410 to a set of rules that define expressions that are allowed in the language that the compiler processes. For example, if compiler 110 processes source code written in a variant of the C programming language, the syntax rules applied at block 412 may be traditional rules for the C programming language augmented by rules that define the creation or use of data objects based on expressions in source code. For example, conventional syntax rules may be augmented with rules defining the syntax that allow use of the "Expression" identifier as used in instructions 214 or 224. Other conventional syntax rules may be used in modified form to reflect the additional processing capability made possible by representing expressions as data objects.

In the described embodiment, the syntax checking at block 412 applies to all instructions within source code 112, including those instructions that are intended to be converted to data objects that are ultimately passed to an application program for execution. In this way, errors in source code developed for execution by an application program, such as the database application 150, can be detected at compile time. Detecting errors at compile time is often desirable because it avoids runtime errors.

If the syntax check performed at block 412 identifies a syntax error, the process may continue to an error handling routine indicated at process block 414. The error handling routine may perform any desired action such as notifying a human user of compiler 110 of the syntax error, logging the error, automatically correcting the syntax error or removing the expression with a syntax error from the source code being processed.

Following the syntax check, processing proceeds to block 413. At block 413 an intermediate representation of the expression is generated. Generating an intermediate representation of a source code expression is a known function of compilers. The intermediate representation is often used to facilitate various processing steps on the program being compiled, such as removing redundant expressions and determining memory requirements for variables and other program objects. Many intermediate representations are known to be used in compilers. Any suitable intermediate representation may be used. In this example, the intermediate representation includes expression trees that describe expressions in the source code. In this example, the external semantic data structures formed to represent expressions can be the same as the intermediate representation of those expressions that would be formed by compiler 110. However, the external semantic data structures and the intermediate representation used internally by the compiler may be different.

The process continues to decision block 416. At decision block 416 a check is made as to whether the expression identified at block 410 represents an expression for which an external semantic data structure needs to be retained. As described above in connection with FIGS. 2A and 2B external semantic data structures, rather than object code, are provided for expressions that use the indicator "Expression." More generally, a data object may be retained for any semantic object where there is an explicit operation in the source code indicating that the data object should be generated or an implicit indication that the data object will be used externally.

If an external data object is to be provided for the expression, processing proceeds to block 418. At block 418 a data object containing the intermediate representation of the expression is stored. In the example of FIG. 4, each of the data objects is a data structure storing an expression tree. However, depending on the specific type of expression or other semantic object processed, any suitable form of data object may be employed.

Processing then proceeds to decision block 430. At decision block 430 a check is made whether there are more expressions in the source code. Where more expressions exist, processing returns to block 410 where the next expression is parsed. Processing then continues with the identified expression. Conversely, where no further expressions remain in the source code, the process of FIG. 4 ends.

If decision block 416 determines that code should be generated from the identified expression as it is being processed, processing continues to decision block 420. At decision block 420, a check is made whether the identified expression uses an expression that is represented as a data object such that no executable code exists to implement that expression.

When an expression references a prior expression for which only a data object is available as a representation of that prior expression, processing proceeds to block 422. At block 422, the data object representing the prior expression is processed to generate object code from that data object. Thereafter, processing proceeds to block 424 where object code is generated for the expression being processed. The object code generated may include object code generated directly from the expression being processed and object code generated from the data object representing the prior expression.

Conversely, when the expression being processed does not reference another expression for which executable code has not been generated, processing proceeds to block 424. At block 424 object code is generated for the expression.

Generation of object code from an intermediate representation of an expression, such as a data object, is a known function of compilers. Object code may be generated at blocks 422 and 424 using techniques used in conventional compilers, whether now known or hereafter developed.

Once object code is generated for one expression, processing proceeds to decision block 430. At decision block 430, the check is made whether more expressions exist in the source code 112. Where more expressions exist, processing returns to block 410 for further processing. Where no further expressions exist, the process ends.

FIG. 4 illustrates one process by which compiler 110 may operate. Compiler 110 may implement other process steps, including process steps used by a conventional compiler. Moreover, the order of execution of process steps illustrated in FIG. 4 is exemplary. The process steps may be implemented in any suitable order. For example, an entire source code file may be parsed before expressions are processed. Moreover, some process steps may be implemented in parallel.

Figure 5A:
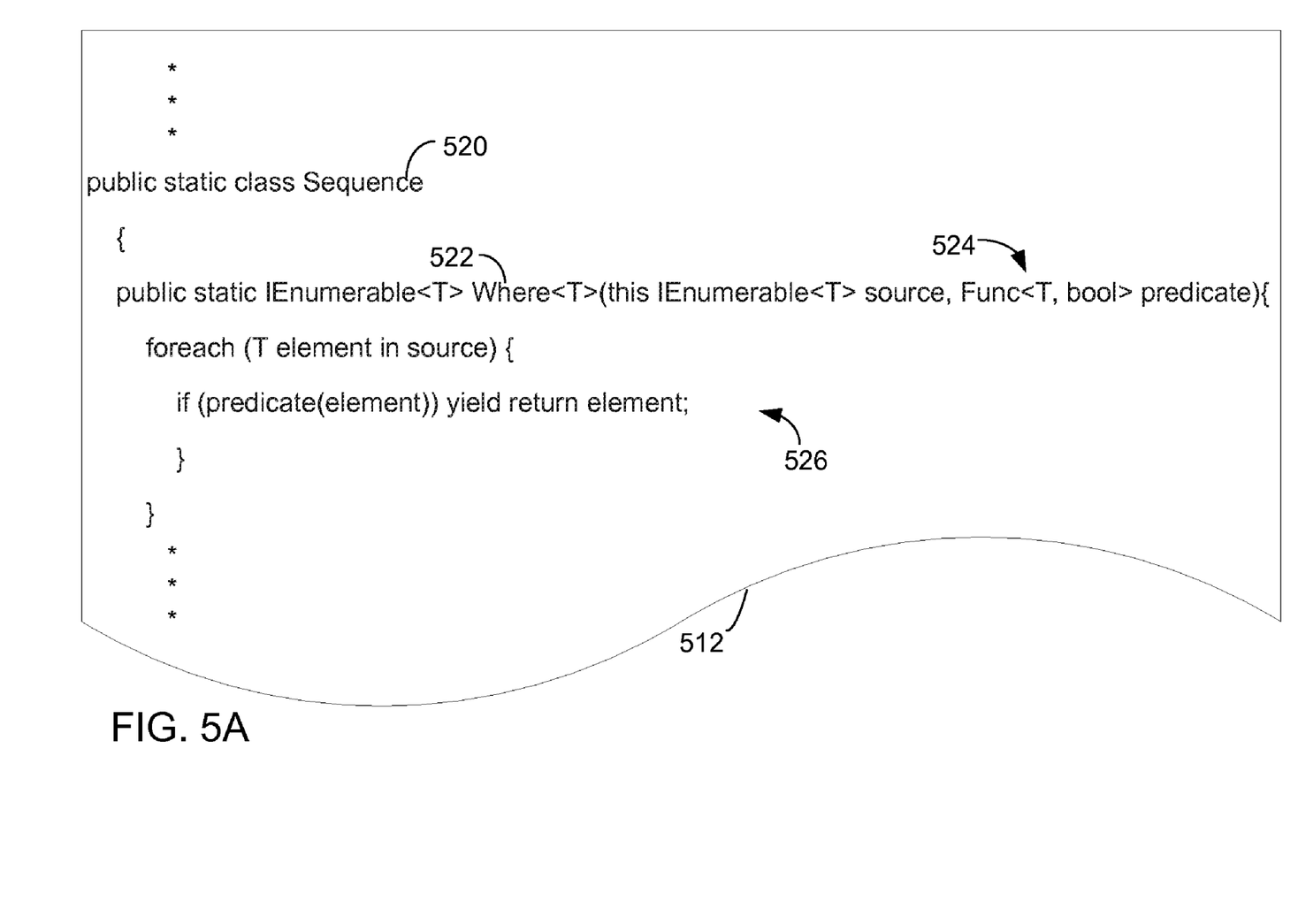
FIGS. 5A and 5B are sketches representing fragments of code that may implement a portion of an API.
Figure 5B:
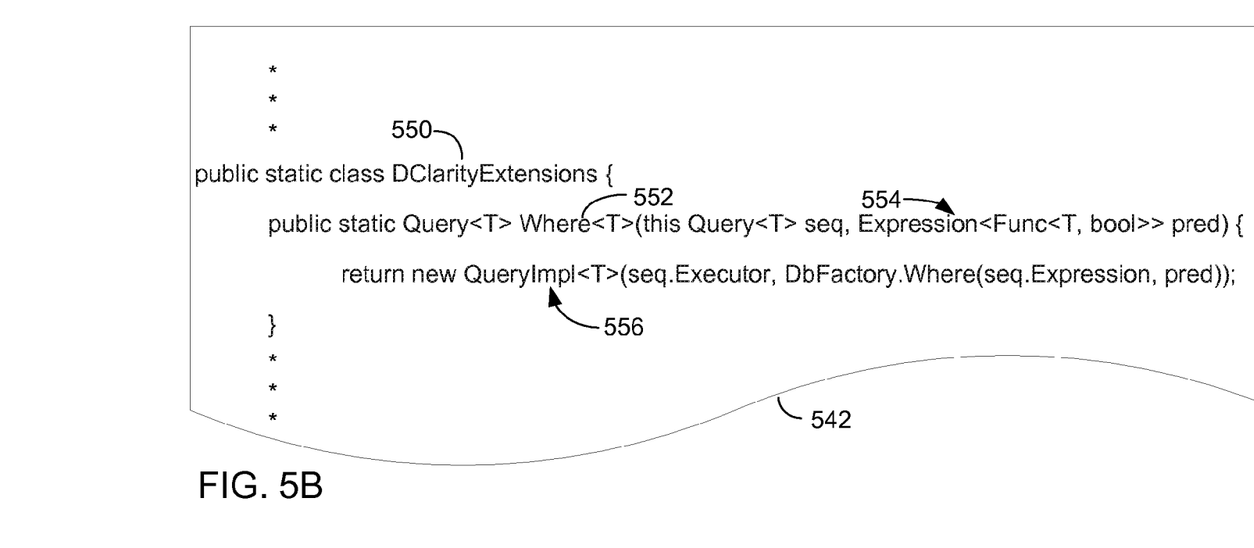
Figure 5C:
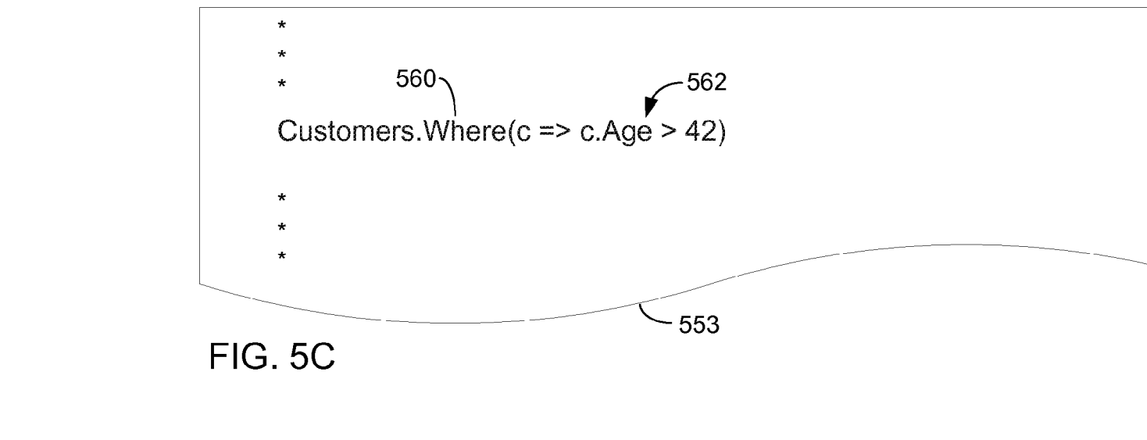
FIG. 5C is a sketch representing a fragment of code that may call a method defined by an API represented in either FIG. 5A or FIG. 5B.

FIGS. 2A and 2B represent an explicit operation included in the source code 112 that identifies semantic objects that should be represented as external data structures. Compiler 110 may alternatively or additionally use other methods to identify those semantic objects that should be represented by external data structures. In some embodiments, it may be desirable to use implicit type conversion to identify semantic objects that are represented as external semantic data structures. FIGS. 5A, 5B and 5C illustrate a benefit of using implicit type conversion.

FIG. 5A depicts a code fragment 512 that may implement a portion of an API. In the example, code fragment 512 may be a portion of API 140 (FIG. 1). Instruction 520 within code fragment 512 defines a class in which methods of API 140 are defined.

Code fragment 512 includes instruction 522 defining a method called "Where." The method defined at instruction 522 has an argument 524. Argument 524 has a type associated with it. In the example of FIG. 5A, argument 524 has a type "Func" associated with it. When the method "Where" defined in instruction 522 is called, it should receive a parameter that is of type "Func." Such a parameter may, for example, be passed as a delegate.

The method defined in code fragment 512 includes a body 526. As body 526 executes, references to argument 524 within method body 526 result in execution of object code prepared by compiler 110 corresponding to the function whose delegate was passed as a parameter.

FIG. 5B shows an alternative form in which an argument may be passed to a method of an API. In this example, a method is defined within an argument that is of an unrealized delegate type. In code fragment 542 illustrated in FIG. 5B, instruction 550 defines a class in which methods of the API are defined. Similar to instruction 522, instruction 552 defines a method entitled "Where." The method defined at instruction 552 also takes an argument. In the example of FIG. 5B argument 554 uses the "Expression" construct. Use of this construct indicates that when called the method defined by instruction 552 should be passed an argument in the form of an external semantic data structure.

The method defined at instruction 552 includes a method body 556. As body 556 executes, when the argument 554 is referenced within method body 556, the external semantic data structure passed as a parameter is accessed. Method body 556 may, for example, use the data structure to generate commands to access database 150.

FIGS. 5A and 5B illustrate that a programmer developing an API may specify different mechanisms by which a method may receive parameters indicating operations to be performed by the API. In each case, a user of the API preparing a source code program 112 may specify the desired sequence of operations using the native language of compiler 110. In one case, those instructions are converted to executable object code by compiler 110 and in another case those source code instructions are converted to a data structure that is converted to commands for database 150 by API 140. One way to ensure that each method in an API receives a parameter of the appropriate type is to require users of the API to write any program calling a method in the API with parameters of the type that match the arguments of the methods that code calls. However, to avoid the need for a programmer developing source code 112 to understand how each method of API 140 processes the instructions in source code 112, an implicit type conversion may be employed by compiler 110.

FIG. 5C illustrates a code fragment 553 that may be contained within source code 112 when an implicit type conversion is used. Code fragment 553 includes an instruction 560 that makes a call to the method "Where." As shown in FIG. 5C, the method called at instruction 560 includes an expression 562 as a parameter passed to the "where" method. In FIG. 5C, no express indication is provided as to whether compiler 110 should treat expression 562 as an expression to be compiled into object code or to be converted into an external semantic data object. Therefore, a user writing a program that calls the method may specify the expression in any desired way. Nonetheless, compiler 110 may rely on implicit type conversion to represent expression 562 in the appropriate format. Compiler 110 may analyze the type of the argument that the called method requires and convert expression 562 to the appropriate type. For example, if the method called at instruction 560 is of the form defined within instruction 522 (FIG. 5A), compiler 110 may convert expression 562 into object code and provide a delegate to this object code as a parameter to the method called at instruction 560 . Alternatively, where the method called at instruction 560 is defined with the form shown in instruction 552 (FIG. 5B), compiler 110 may recognize from the type of the argument received by that method that expression 562 should be converted to an external semantic data structure. That external semantic data structure may then be passed to the method called at instruction 560.

By providing implicit type conversion, significant flexibility is provided to a programmer generating source code 112. Because compiler 110 selects the appropriate expressions to represent as external semantic data objects to pass to API 140, the programmer is relieved of the burden of needing to know the specific representation of the arguments for each method of API 140 and explicitly quoting those that are to be passed as data objects.

Having thus described several aspects of at least one embodiment of this invention, it is to be appreciated that various alterations, modifications, and improvements will readily occur to those skilled in the art.

For example, it is described that data objects formed for expressions in which parameters have been identified as having a type that is specified outside of the expression include a generic representation of that parameter. Parameters of data objects could be represented generically in data objects even if type information for that parameter is available. Further, other aspects of an semantic object other than the type of its parameters may be represented generically in a data object, with specific information obtained from context used to generate executable code from the data object.

Also, expressions were used as an example of semantic objects that may be represented as data objects. Any desired semantic object, such as a method or a class, may be represented as a data object.

Such alterations, modifications, and improvements are intended to be part of this disclosure, and are intended to be within the spirit and scope of the invention. Accordingly, the foregoing description and drawings are by way of example only. The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

In embodiments described above, "object code" is described. This term is also intended to be used in a generic sense to refer to compiled code. The term may encompass executable files, files containing DLL's or other representations of a compiler output.

Furthermore, the term "compiler" is also intended in a generic sense and the time at which the "object code" is generated in not intended to be a limitation of the invention. For example, the term compiler may encompass applications sometimes referred to as "Just In Time (JIT) compilers" or interpreters.

Furthermore, the term "file" is also used in a generic sense to refer to logically related data. The term is not intended to be limited to any specific organization of data by an operating system or any physical positioning on a storage media.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable medium having computer-executable instructions that when executed by a processor perform compiling a source program written in a native programming language, the source program having a plurality of internal semantic objects written in the native programming language, according to acts comprising:
    determining, based on an implicit type conversion, whether an internal semantic object of the plurality of internal semantic objects within the source program written in the native programming language is used in a way signifying that an external semantic data object is to be created to represent the internal semantic object; and
    selectively processing the internal semantic object based on the implicit type conversion, by:
    when the implicit type conversion indicates that the internal semantic object is used in a way signifying that the external semantic data object is to be created, processing, according to a syntax of the native programming language, the internal semantic object of the plurality of internal semantic objects and creating the external semantic data object representing the instructions included in the internal semantic object; and
    when the implicit type conversion does not indicate that the internal semantic object is used in a way signifying that the external semantic data object is to be created, converting the internal semantic object into object code.

2. The computer readable medium of claim 1, wherein the internal semantic object comprises a statement block.

3. The computer readable medium of claim 1, wherein the internal semantic object comprises instructions to be executed by at least one application that responds to instructions in a programming language different form the native programming language.

4. The computer readable medium of claim 1, wherein the computer-executable instructions for compiling a program further comprise computer-executable instructions to create an external semantic data object that exposes an expression in the program for each of a plurality of expression types, the plurality of expression types comprising binary expressions, unary expressions, ternary expressions, constant expressions, field access expressions, property access expressions, method call expressions, object initializer expressions, object creation expressions, collection and array initializer expressions, array creation expressions, cast expressions, parameter reference expressions, lambda expressions, invocation of semantic expression trees, free variable capture expressions and outer variable capture expressions.

5. The computer readable medium of claim 1, wherein the external semantic object is represented by a semantic expression tree.

6. The computer-readable medium of claim 1, wherein the external semantic data object contains a reference to a second external semantic data object.

7. The computer-readable medium of claim 1, wherein the external semantic data object captures a reference to a free variable or outer variable.

8. A process of preparing a program that accesses an application through an application program interface having a method with an argument, the argument having a type associated therewith, the program having an internal object representing a call to the method, the call having a parameter associated therewith that is indicated as the argument of the method, the parameter representing instructions in the program, the process comprising:

with at least one processor:
determining whether the argument is of a type of an external semantic data structure;
when the parameter is associated with the argument of the type of the external semantic data structure,
automatically and selectively creating in memory the external semantic data structure representing the instructions of the parameter, based on the type of the argument of the method of the application program interface; and
when the method is called, passing the parameter to the method of the application program interface as the external semantic data structure
when the argument is not of the type of the external semantic data structure, converting the internal object into object code,
whereby the type of the parameter is determined using implicit type conversion.

9. The process of claim 8, wherein automatically and selectively creating the external semantic data structure in the memory based on the type of the argument comprises selectively creating an external semantic data structure representing the parameter when the parameter has a delegate type.

10. The process of claim 8, additionally comprising, at run-time, using the external semantic data structure to generate at least one command to the application.

11. The process of claim 10, wherein the act of using the external semantic data structure to generate at least one command is performed by the application program interface.

12. The process of claim 8, wherein the source code is in a language having a syntax and creating the external semantic data structure representing the call parameter comprises binding names of variables used within a call argument according to the syntax.

13. The process of claim 8, wherein the source code is in a language having a syntax and creating the external semantic data structure representing the call parameter comprises checking the computer program instructions within the call parameter for syntax errors.

14. A computing device comprising at least a processor and memory comprising at least one computer-readable medium having computer-executable modules for processing when executed by the processor a program in a programming language having a plurality of expressions, the computer-executable modules comprising:

a) a compiler module for:
determining, based on implicit type conversion, whether an expression of the plurality of expressions is associated in the program with an API module that receives an expression of a type of an external data structure;
when the expression is associated with the API module, converting the expression of the plurality of expressions in the programming language into the external data structure representing the expression and of the type used by the API module by performing at least one compiler operation on the expression, and
when the expression is not associated with the API module, converting the expression into object code;
b) the API module for receiving the external data structure having the type and processing the external data structure to produce at least one command from the external data structure that implements the expression; and
c) an application for receiving the at least one command and performing an operation specified by the at least one command.

15. The computing device of claim 14, wherein the application comprises a database, and wherein the at least one command provides access to the database.

16. The computing device of claim 14, wherein the compiler module comprises a portion for generating a second data structure from a second expression in the plurality of expressions and a portion for generating object code from the second data structure.

* * * * *